(12) United States Patent
Hou

(10) Patent No.: US 8,630,237 B2
(45) Date of Patent: Jan. 14, 2014

(54) METHOD OF RESOLVING RECEPTION CONFLICTS FOR MULTI-CARD MULTI-STANDBY MOBILE TERMINAL

(75) Inventor: Qingzhu Hou, Shanghai (CN)

(73) Assignee: Spreadtrum Communications (Shanghai) Co., Ltd., Shanghai (CN)

( * ) Notice: Subject to any disclaimer, the term of this patent is extended or adjusted under 35 U.S.C. 154(b) by 218 days.

(21) Appl. No.: 13/105,601

(22) Filed: May 11, 2011

(65) Prior Publication Data
US 2012/0057525 A1    Mar. 8, 2012

(30) Foreign Application Priority Data
Sep. 7, 2010   (CN) .......................... 2010 1 0278680

(51) Int. Cl.
*H04W 4/00*     (2009.01)
*H04J 3/06*     (2006.01)
*H04B 15/00*    (2006.01)

(52) U.S. Cl.
USPC ............................. 370/328; 370/350; 455/502

(58) Field of Classification Search
USPC ........................................................ 370/328
See application file for complete search history.

(56) References Cited

U.S. PATENT DOCUMENTS

| | | | | |
|---|---|---|---|---|
| 5,896,376 A | * | 4/1999 | Alperovich et al. | 370/348 |
| 2011/0217969 A1 | * | 9/2011 | Spartz et al. | 455/422.1 |
| 2012/0135715 A1 | * | 5/2012 | Kang et al. | 455/412.1 |
| 2012/0149361 A1 | * | 6/2012 | Esch et al. | 455/422.1 |

FOREIGN PATENT DOCUMENTS

| | | |
|---|---|---|
| CN | 1976516 A | 6/2007 |
| CN | 101060697 A | 10/2007 |
| CN | 101203005 A | 6/2008 |
| CN | 101217747 A | 7/2008 |
| WO | WO 2011/092254 A1 * | 8/2011 |

* cited by examiner

*Primary Examiner* — Noel Beharry
(74) *Attorney, Agent, or Firm* — Kilpatrick Townsend & Stockton LLP

(57) ABSTRACT

The present invention provides a method of resolving reception conflicts for a multi-card multi-standby mobile terminal, which is for resolving the conflicts of the mobile terminal based on Global System for Mobile communication (GSM) network and in the standby mode, including: acquiring synchronization result with base stations and judging if there are time slot conflicts between multiple SIM cards of the multi-card multi-standby mobile terminal according to the synchronization result; if the conflicts being non-time slot conflicts, receiving and processing data of different SIM cards in different time slots of a TDMA frame; and if the conflicts being time slot conflicts, receiving and processing data of a non-current SIM card in redundant frames of BCCH or CCCH of a current SIM card. The present invention manages the logical channel conflicts with other SIM cards through using the redundant frames corresponding to the BCCH or CCCH of a SIM card, thereby resolving the signal conflicts because of the signals from different base stations being not synchronized for a dual-card dual-standby handset and is compatible with the prior art.

12 Claims, 6 Drawing Sheets

METHOD OF RESOLVING RECEPTION CONFLICTS FOR MULTI-CARD MULTI-STANDBY MOBILE TERMINAL

CROSS REFERENCE TO RELATED APPLICATIONS

The present application claims the priority of Chinese Patent Application No. 201010278680.5, entitled "Method of resolving reception conflicts for multi-card multi-standby mobile terminal", and filed Sep. 7, 2010, the entire disclosure of which is incorporated herein by reference.

FIELD OF THE INVENTION

The present invention relates to mobile communication technology, and particularly relates to a method of resolving reception conflicts for a multi-card multi-standby mobile terminal.

DESCRIPTION OF PRIOR ART

With the rapid development of mobile communication technology, mobile communication products have become necessities of people's daily life. Particularly, the phenomenon that one person needs two handsets has become more and more universal. For example, the people who need to work in two different places use different subscriber identity module (SIM) cards in different cities. However, it is inconvenient to change SIM cards frequently or to carry two handsets, so dual-card dual-standby handsets come into being.

At present, two sets of chips are used in dual-card dual-standby handsets. For example, Chinese patent application No. 200610157647.0 discloses a kind of dual-card dual-standby handsets comprising a master and a slave. The master comprises a master socket, a master antenna, a master radio frequency (RF) module and a master baseband transaction module, wherein the master antenna, the radio frequency (RF) module and the master baseband transaction module are connected sequentially; the slave comprises a slave socket, a slave antenna, a slave radio frequency (RF) module and a slave baseband transaction module, wherein the slave antenna, the slave frequency (RF) module and the slave baseband transaction module are connected sequentially; the master baseband transaction module and the slave baseband transaction module communicate with each other through a communication module. It is obvious that the master and the slave of this kind of dual-card dual-standby handsets work on their own separate baseband transaction modules. Therefore, the cost of this kind of dual-card dual-standby handsets is high and the volume is also much larger.

In order to solve this problem, a kind of dual-card dual-standby handsets which uses one set of chip comes into being. This kind of dual-card dual-standby using one set of chip comprises one antenna, one RF module, one baseband transaction module and other peripheral equipments. Because the kind of dual-card dual-standby using one set of chip only has one RF module, it is necessary for the RF module to receive system messages and other messages from two carriers.

However, two different SIM cards of a dual-card dual-standby handset need to communicate with different base stations. Because there is no synchronization mechanism between different base stations, signals from two base stations are not synchronized. In this situation, the two SIM cards need to synchronize respectively with two different base stations which are not synchronized, which may lead signals conflicts between the two SIM cards and thus affect the normal communication.

SUMMARY OF THE INVENTION

An object of the present invention is to provide a method of resolving reception conflicts for a multi-card multi-standby mobile terminal, which resolves the signals conflicts problem of a dual-card dual-standby handset because of signals from two base stations being not synchronized in an easy way.

To achieve the project, the present invention provides a method of resolving reception conflicts for a multi-card multi-standby mobile terminal, which is for resolving the conflicts of the mobile terminal based on Global System for Mobile communication (GSM) network and in the standby mode, comprising:

Compared with the prior art, the present invention has the following advantages: managing the logical channel conflicts with other SIM cards through using the redundant frames corresponding to the BCCH or CCCH of a SIM card, thereby resolving the signal conflicts because of the signals from different base stations being not synchronized for a dual-card dual-standby handset and is compatible with the prior art.

DETAILED DESCRIPTION OF THE EMBODIMENTS

Hereunder, the present invention will be described in detail with reference to embodiments, in conjunction with the accompanying drawings.

Although the present invention has been disclosed hereinafter as above with reference to preferred embodiments in details, the present invention can be implemented in other embodiments which are different. Therefore, the present invention should not be limited to the embodiments disclosed here.

As described in the description of prior art part, because there is no synchronization mechanism between two different base stations, signals from the two base stations are not synchronized. In this situation, two SIM cards of a dual-card dual-standby handset need to synchronize respectively with two different base stations which are not synchronized, which may lead signal conflicts between the two SIM cards and thus affect the normal communication. The signal conflicts are particularly serious of a dual-card dual-standby handset in the standby mode.

Figure 1:
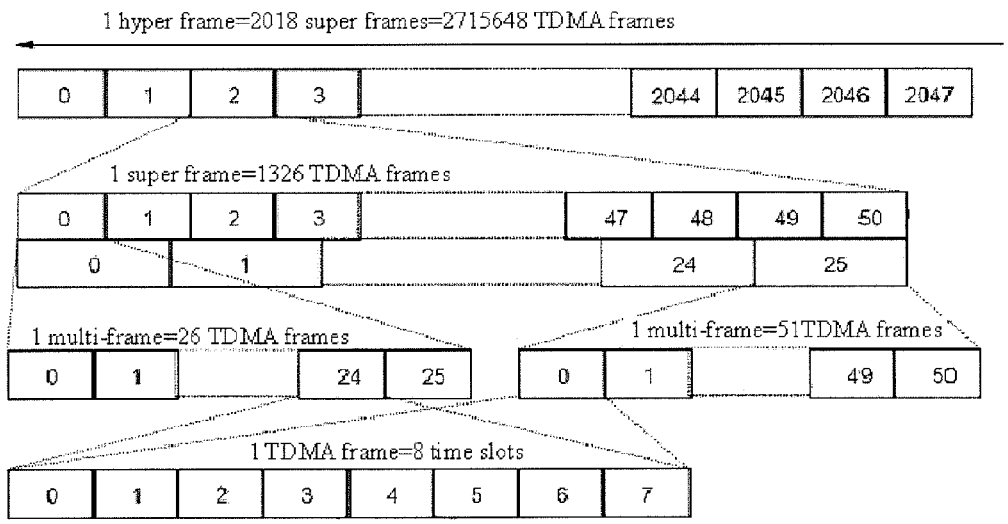
FIG. 1 shows a schematic diagram of a frame of a physical channel of a GSM system.

FIG. 1 shows a schematic diagram of a physical channel frame structure of a GSM system. The GSM system uses the time division multiple access (TDMA) method. The TDMA refers to dividing a wireless carrier of a broadband into a number of time-division channels by time (or time slot), each user occupying a time slot and transmitting/receiving messages only in the occupied time slot.

Referring to FIG. 1, as for a GSM system using the TDMA method, a TDMA frame at the bottom of the frame structure includes 8 time slots (namely physical channel). The TDMA frames constitute a multi-frame and the multi-frame has two kinds of structures: one comprising 26 coherent TDMA frames, and the other comprising 51 coherent TDMA frames. When different logical channels occupy a same physical channel, the multi-frames are needed. The multi-frame comprising 26 TDMA frames is used in traffic channel and associated control channel, and the multi-frame comprising 51 TDMA frames is used in control channel. A plurality of multi-frames constitute a super frame, which is a coherent 51×26 TDMA frame, in other words, a super frame comprises 51 multi-frames wherein each multi-frame comprises 26 TDMA frames, or comprises 26 multi-frames wherein each multi-frame comprises 51 TDMA frames. 2048 super frame constitute a hyper frame which is used in encrypted voice and data.

The physical channels of the GSM system support the physical channels. The physical channels are divided into two types: traffic channels (TCH) and control channels (CCH).

Figure 2:
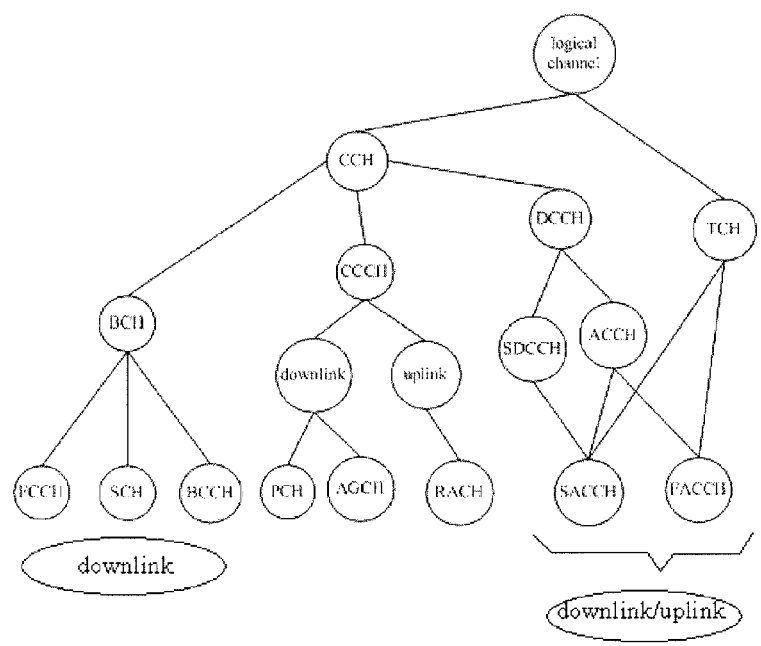
FIG. 2 shows a schematic diagram of logical channel types of a GSM system.

FIG. 2 shows a schematic diagram of logical channel types of a GSM system.

Wherein, the TCHs carry encoded voice data or user data, which are adapted for implementing data exchange between voice services and data services. The CCHs are adapted for transmitting control instructions and synchronous data, and are mainly divided into three types: broadcast channels (BCH), common control channels (CCCH) and dedicated control channels (DCCH).

Wherein, the broadcast channels are only used as one-way downlink channels for a base station transmitting information to a terminal, and are divided into three types: frequency correction channels (FCCH), which contains information for the frequency calibration of a mobile station; synchronization channels (SCH), which contains information for terminal frame synchronization and identification information for a base station transceiver; and broadcast control channels (BCCH), which is adapted for transmitting broadcast system information to the terminal.

The common control channels are shared by all the terminals in the system and are divided into three types: page channels (PCH), for paging a called terminal; random access channels (RACH), for the terminals making network applications at random; and granted access channels (AGCH), for the base station responding to the network applications from the terminals.

The dedicated control channels are assigned to the terminals for signal transmission between the base station and the terminals. The dedicated control channels are divided into two types: separate dedicated control channels (SDCCH) and associated control channels (ACCH).

Figure 3:
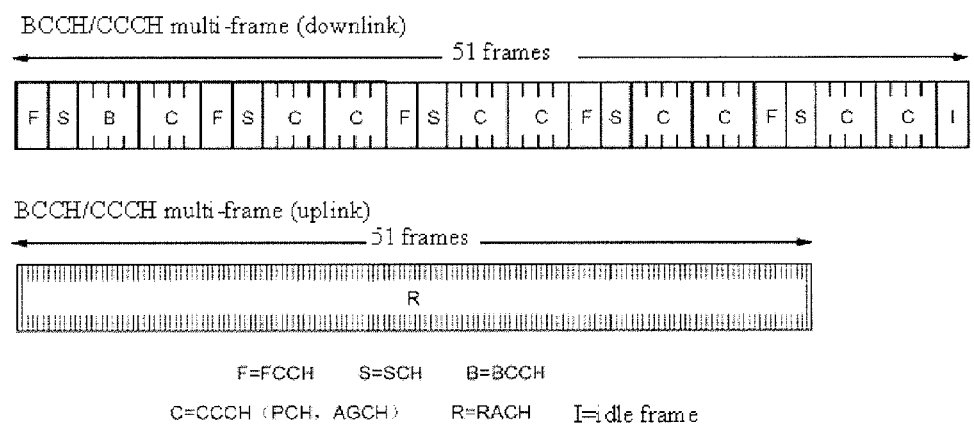
FIG. 3 shows a schematic diagram of a multi-frame of a control channel of a GSM system.

As for a terminal in the standby mode, the data communication between the terminal and the base station are implemented through a control channel. The control channel is a multi-frame comprising 51 frames. FIG. 3 shows a schematic diagram of a multi-frame of a control channel of a GSM system. Referring to FIG. 3, the multi-frame (downlink) of the control channel is mapped to a plurality of frequency correction channels, synchronization channels, broadcast control channels or common control channels. Wherein, the common control channels occupied in the standby mode are the paging channels; the random access channels and the granted access channels are only occupied in the event of a service request.

Referring to FIG. 3, each frequency correction channel and synchronization channels always occupy one frame of a multi-frame (specifically a time slot of one frame), while each broadcast control channel and common control channel occupy four frames of the multi-frame.

Based on the above description, when a multi-card multi-standby mobile terminal is in the standby mode, a plurality of SIM cards in the multi-card multi-standby mobile terminal need to receive control signals from the base station respectively, and the control signals occupy the frequency correction channels, synchronization channels, broadcast control channels or common control channels. However, if the control signals received by the SIM cards are provided by different base stations which are not synchronized, conflicts between logical channels used by a SIM card communicating with the base station and logical channels of other SIM cards are likely to occur, in other words, the time for the mobile terminal to receive data is adjacent or the same.

Take two SIM cards for example, the mobile terminal are set with a SIM card A and a SIM card B, wherein the SIM card A communicates with a base station A, and the SIM card B communicates with a base station B. The paging channel A occupied by the SIM card A communicating with the base station A may overlap in part with the paging channel B occupied by the SIM card B communicating with the base station B, and this situation is named as paging channel conflicts. Similar to the paging channel conflicts, conflicts may occur between the broadcast control channel of the SIM card A and the broadcast control channel of the SIM card B, so does the broadcast control channel of one SIM card and the paging channel of the other SIM card. When the channel conflicts occur, the mobile terminal can not guarantee the normal communication with the base station, and the mobile terminal can not reside in a cell normally.

Figure 4:
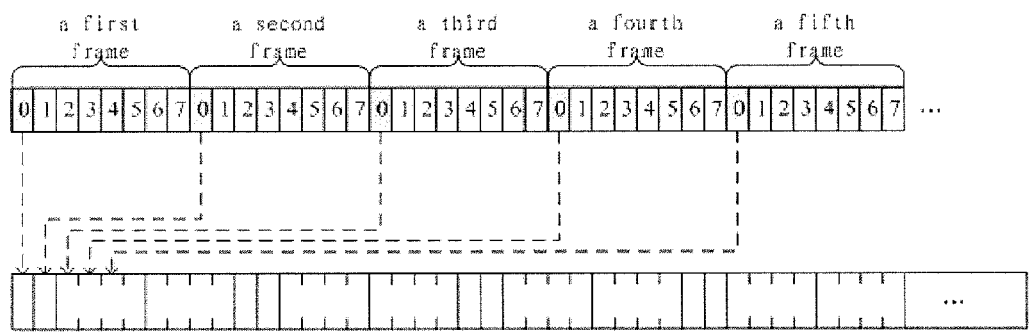
FIG. 4 shows a corresponding relationship of a control channel multi-frame with a TDMA frame.

FIG. 4 shows a corresponding relationship of a control channel multi-frame with a TDMA frame. Referring to FIG. 4, the zero time slot of a TDMA frame is used for the base station to communicate with a SIM card of the mobile terminal. Wherein, the zero time slot of the first frame is mapped to a frequency correction channel; the zero time slot of the second frame is mapped to a synchronization channel; the zero time slot of the third frame is mapped to a broadcast control channel; and the zero time slot of the fourth frame is mapped to a common control channel. The follow-up frames are mapped in a similar manner, and will not be described here.

Referring to FIG. 3 and FIG. 4, as for a GSM system, the synchronization channel occupies one TDMA frame for communication, while the broadcast control channel and the common control channel both occupy four TDMA frames for communication. Specifically, as for the broadcast control channel and the common control channel which occupy four TDMA frames, the mobile terminal needs to receive burst sequence sent by the base station at the four time slots in correspondence with the four TDMA frames and to decode the burst sequence, and then the communication with the base station is completed.

As the signal-receiving conditions of different mobile terminals communicating with the base stations vary, the burst sequence sent from the base station is usually redundant. Specifically, when the communication is in good condition, the data receiving and decoding are finished in the first one, two or three frames of the four time slot frames, therefore, the burst sequence received later is dummy burst, and the dummy burst receiving or not does not affect the communication between the base station and the mobile terminal.

Therefore, when time slot conflicts occur on a mobile terminal with a plurality of SIM cards in the standby mode, redundant frames in the logical channel (corresponding to the TDMA frames of the dummy burst) can be used to receive data sent from different base stations (corresponding to different SIM cards), thereby avoiding the communication failure caused by the time slot conflicts of multiple SIM cards.

Based on the above description, the present invention provides a method of resolving reception conflicts for a multi-card multi-standby mobile terminal, which avoids the communication failure caused by the channel conflicts and solves the location of residence problem of a mobile terminal in the standby mode. According to different embodiments, the method of resolving reception conflicts of the present invention can be used on a mobile terminal installed with two or more SIM cards, for example, a dual-card dual-standby handset or a triple-card triple-standby handset. In the following embodiments, a mobile terminal installed with two SIM cards is taken as an example; however, the present invention should not be limited to the embodiments disclosed here. Wherein, the two SIM cards in the mobile terminal are SIM card A and SIM card B, a base station communicating with the SIM card A is base station A, and a base station communicating with the SIM card B is base station B.

When a multi-card multi-standby mobile terminal communicates with a base station, the multi-card multi-standby mobile terminal synchronizes with the base station, wherein the synchronization process is for determining the frames structure of the multi-card multi-standby mobile terminal communicating with the base stations, and the synchronization result is stores in the multi-card multi-standby mobile terminal.

Figure 5:
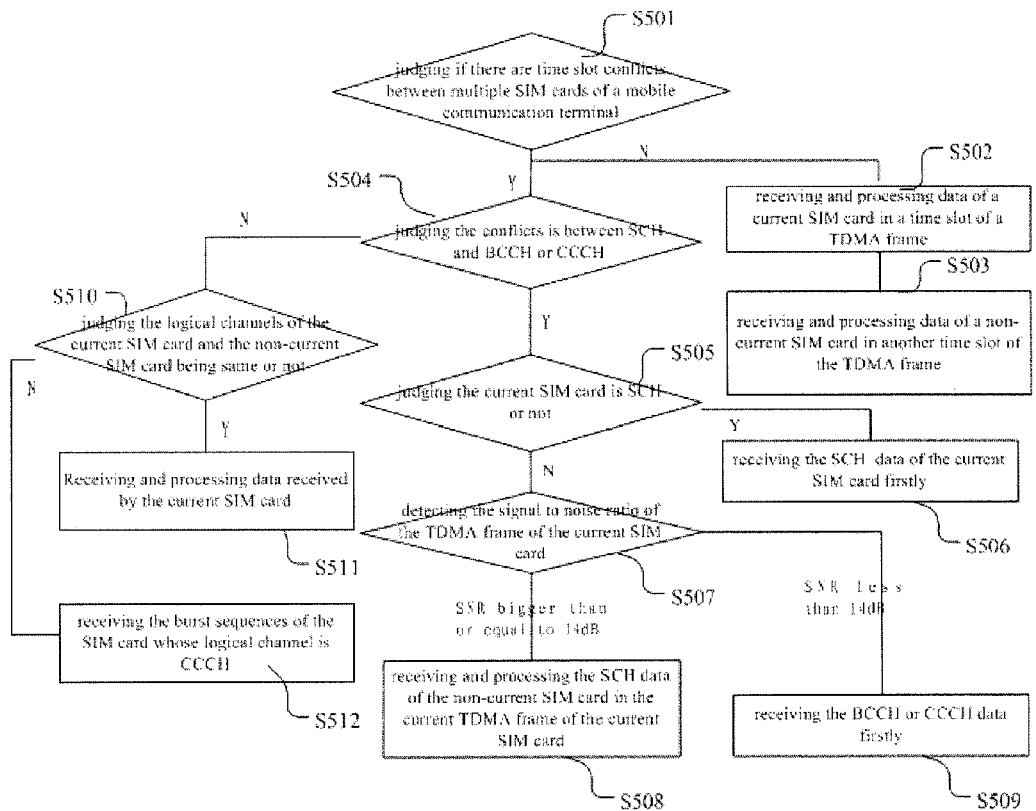
FIG. 5 shows a flow chart of a method of resolving reception conflicts for a multi-card multi-standby mobile terminal in the first embodiment of the present invention.

FIG. 5 shows a flow chart of a method of resolving reception conflicts for a multi-card multi-standby mobile terminal in the first embodiment of the present invention. The method comprises the following steps.

A step S501 is performed as follows: acquiring synchronization result with base stations and judging if there are time slot conflicts between multiple SIM cards of a multi-card multi-standby mobile terminal according to the synchronization result.

After the mobile terminal finishes the synchronization, the mobile terminal is in the standby mode. Then, the mobile terminal determines whether the frame structures corresponding to different SIM cards overlap according to the synchronization result stored thereof. If the frame structures overlap, there are conflicts between the SIM cards.

As for the above conflicts between the SIM cards, the conflicts may be time slot conflicts or non-time slot conflicts. The time slot conflicts refers to the physical channel occupied by the logical channel of the SIM card A communicating with the base station A partially overlapping with the physical channel occupied by the logical channel of the SIM card B communicating with the base station B, in other others, the time for different SIM cards to receive data is adjacent or the same.

Similarly, the mobile terminal judges if there are time slot conflicts between different SIM cards according to the frame-structure overlapping situation of the synchronization result. Specifically, the mobile terminal determines the time slots in which to receive data sent from the base station A and the base station B; if the time slot for receiving data from base station A partially or completely overlaps with the time slot for receiving data from base station B, then the mobile terminal determines there are time slot conflicts between the SIM cards; if there is no time slot overlapping, the mobile terminal determines the conflicts between the SIM cards are non-time slot conflicts.

Similarly, because the frame structure of the SIM cards communicating with the base stations can be determined according to the synchronization result, the synchronization result can further be used for judging the types of the time slot conflicts, in other words, for judging the time slot conflicts being conflicts between the paging channels, conflicts between the paging channels and the common control channels, conflicts between the paging channels and the broadcast control channels, or conflicts between the common control channels and the broadcast control channels, and so on.

Figure 6A:
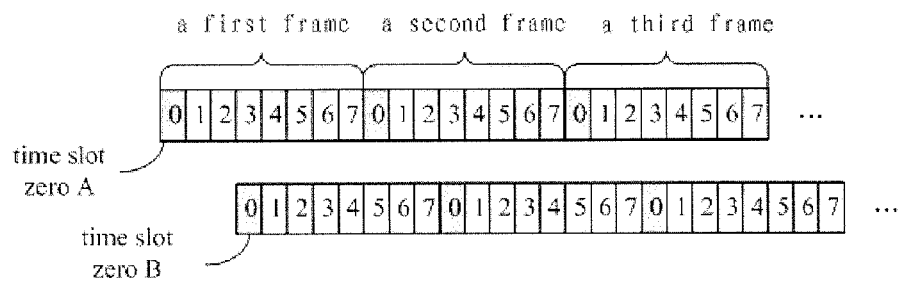
FIG. 6a and FIG. 6b respectively show a signal reception diagram with non-time slot conflicts and a signal reception diagram with time slot conflicts.
Figure 6B:
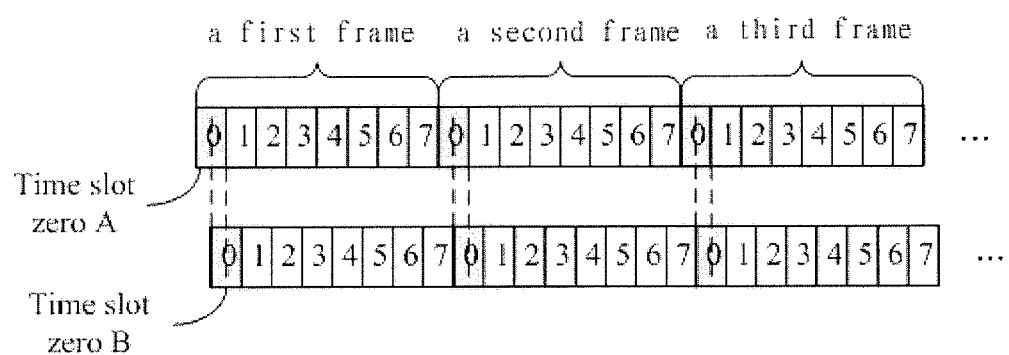

FIG. 6a and FIG. 6b respectively show a signal reception diagram with non-time slot conflicts and a signal reception diagram with time slot conflicts.

Referring to FIG. 6a, as for non-time slot conflicts, the burst sequences corresponding to the two SIM cards are received in different time slots, and the mobile terminal installed with the two SIM cards does not need to receive and process data from two different base stations at the same time slot. In this case, two different time slots are chosen as the physical channels for the two SIM cards communicating with the base stations, which are treated similar to two single-card single-standby mobile terminals. Specifically, a step S502 is performed: receiving and processing data corresponding to the current SIM card in a time slot of a TDMA frame; then, a step S503 is performed: receiving and processing data corresponding to the non-current SIM card in another time slot of the same TDMA frame. For example, the data corresponding to the SIM card A are received and processed in the time slot zero, and the data corresponding to the SIM card B are received and processed in any time slot from the time slot 1 to the time slot 7 (for example, the time slot 3). At any time, the mobile terminal just process data from one base station, which avoids communication conflicts.

Referring to FIG. 6b, as for time slot conflicts, the mobile terminal installed with two SIM cards could not receive and process data corresponding to the two SIM cards in the same TDMA frame. To solve this problem, a method based on the dummy burst and redundant frames of a GSM system described above is illustrated as follows.

Referring to FIG. 5, a step S504 is performed: judging the conflicts being between a SCH and a BCCH or between a SCH and a CCCH.

If the conflicts are between the SCH and the BCCH or between the SCH and the CCCH, in other words, the conflicts occur between the SCH of the SIM A and the BCCH or the CCCH of the SIM card B, or the conflicts occur between the SCH of the SIM B and the BCCH or the CCCH of the SIM card A, then a step S505 is performed right along: judging the current SIM card is SCH or not. If the current SIM card is SCH, then a step S506 is performed right along: receiving the SCH data corresponding to the current SIM card firstly, then receiving the data corresponding to the non-current SIM card; if the current SIM card is CCCH or BCCH, a step S507 is performed right along: detecting the signal to noise ratio of the TDMA frame corresponding to the current SIM card.

If the signal to noise ratio of the TDMA frame corresponding to the current SIM card is bigger than or equal to 14 dB, then the current signals are received in good condition, specifically, the CCCH or BCCH corresponding to the current SIM card has redundant frames, and the SCH just needs to occupy one TDMA frame, then, a step S508 is performed right along: after the current SIM card finishes receiving and processing the CCCH or BCCH data of the current TDMA frame, receiving and processing the SCH data corresponding to the non-current SIM card in the current TDMA frame (the redundant frames), and then receiving and processing the follow-up CCCH or BCCH data corresponding to the current SIM card.

Figure 7:
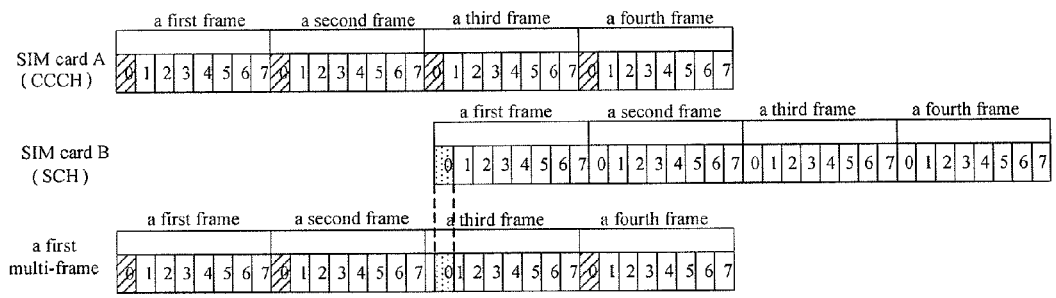
FIG. 7 shows a schematic diagram of a multi-frame of a step S508 about a conflict resolution of FIG. 5.

In this case, the CCCH or BCCH data corresponding to the current SIM card are received and processed in three or less TDMA frames through receiving burst sequences; at the same time, the SCH data corresponding to the non-current SIM card are received and processed in one TDMA frame through receiving burst sequence, wherein the three CCCH or BCCH TDMA frames corresponding to the current SIM card and the one TDMA frame corresponding to the non-current SIM card constitute a multi-frame, wherein the three TDMA frames corresponding to the current SIM card may comprise redundant frames. FIG. 7 shows a schematic diagram of a multi-frame of a step S508 about a conflict resolution of FIG. 5. The first two TDMA frames of a first multi-frame is for receiving two burst sequences by the current SIM card A; then the third TDMA frame is occupied by the SIM card B for receiving a burst sequence; at last, the follow-up burst sequences are received by the SIM card A.

If the signal to noise ratio of the TDMA frame corresponding to the current SIM card is less than 14 dB, then the current signals are not received in good condition, and a step S509 is performed: receiving the CCCH or BCCH data firstly, in order that the CCCH or BCCH data are received completely. In this case, the SCH data are discarded.

If the conflicts are not between the SCH and the BCCH or between the SCH and the CCCH, the conflicts are between the CCCH and the BCCH of the SIM card A and the SIM card B, then a step S510 is performed: detecting the logical channels of the current SIM card and the non-current SIM card are the same or not; if the logical channels are the same, then a step S511 is performed: receiving and processing data received by the current SIM card firstly, discarding the burst sequences received when the time slot conflicts occurs between the non-current SIM card and the current SIM card, and receiving the data of the non-current SIM card after the time slot conflicts; if the logical channels of the current SIM card and the non-current SIM card are different, a step S511 is performed: receiving and processing the burst sequences corresponding to the SIM card whose logical channel is CCCH firstly.

The reason for receiving and processing data of CCCH firstly is that the data of CCCH comprise more useful information and it is more important for the communication of the mobile terminal and the base station. The reason for receiving data of the current SIM card firstly when the logical channels of different SIM cards are the same is for improving the communication efficiency and avoiding the waste of data received.

Hereafter, the method of resolving the time slot conflicts of BCCH and CCCH between two different SIM cards is illustrated in detail, with reference to specific applications.

FIG. 8a to FIG. 8d shows 4 kinds of specific applications and multi-frame diagrams of the corresponding conflict resolutions. Specifically, the SIM card A is the current SIM card and the SIM card B is the non-current SIM card; the conflicts between the two SIM cards occur between the third TDMA frame of the SIM card A and the first TDMA frame of the SIM card B. However, there is difference in signals reception of the SIM card A, thereby affecting the number of the redundant frames of the SIM card A.

Figure 8A:
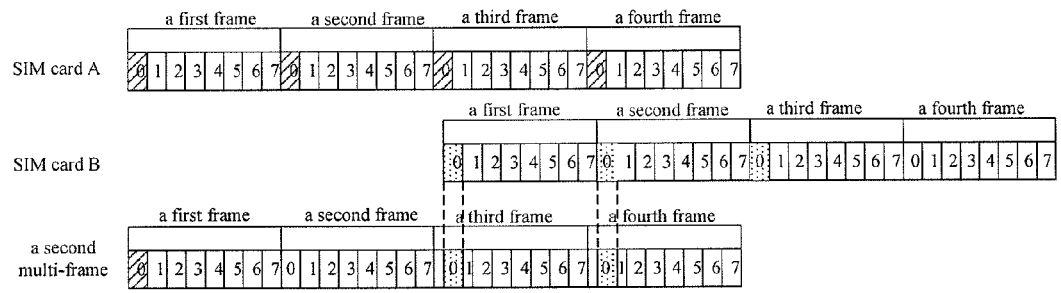
FIG. 8a to FIG. 8d shows 4 kinds of specific applications and multi-frame diagrams of the corresponding conflict resolutions.

Referring to FIG. 8a, the SIM card A finishes receiving and processing the BCCH or CCCH data in the time slot zero of the first TDMA frame, the second and subsequent TDMA frames are redundant frames, and the data received is dummy burst. In this case, the mobile terminal chooses the SIM card B, and receives the first and second burst sequences of the SIM card B in the third and fourth TDMA frames of the SIM card A. If the communication between the base station and the SIM card B is completed after the first and second burst sequences of the SIM card B are received, the data of the SIM card A and the SIM card B both are received in the second multi-frame constituted by four TDMA frames; if data decoding for the SIM card B further needs to receive the third or fourth burst sequence, a comparison between the third or fourth burst sequence of the SIM card B and the subsequent logical channels of the SIM card A is performed, according to the method shown in FIG. 5.

Figure 8B:
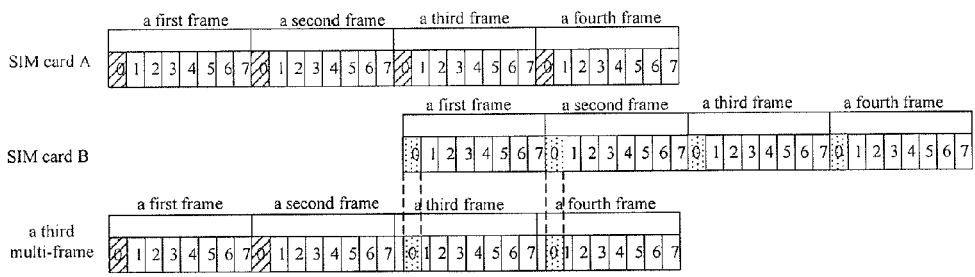

Referring to FIG. 8b, if the SIM card A needs to receive two burst sequences, the receiving and processing of the BCCH or CCCH data are finished in the time slot zero of the second TDMA frame and the third and fourth TDMA frames are redundant frames. In this case, similar to FIG. 8a, the mobile terminal chooses the SIM card B, and receives the first and second burst sequences of the SIM card B in the third and fourth TDMA frames of the SIM card A.

Figure 8C:
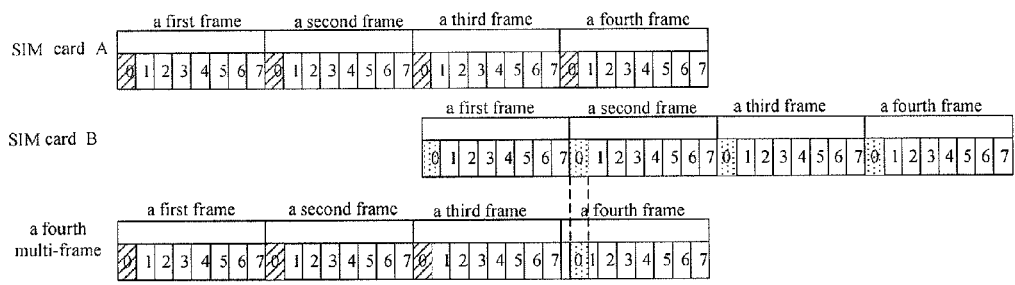

Referring to FIG. 8c, if the SIM card A needs to receive three burst sequences to finish the receiving and processing of the BCCH or CCCH data, meanwhile, the SIM card B receives the first burst sequence of the BCCH or CCCH when the SIM card A receives the third burst sequence in the third TDMA frame, then the reception conflicts of burst sequence occurs. In this case, according to the conflicts resolution method shown in FIG. 5, if the conflicts of the SIM card A and the SIM card B are in the same logical channels, the third burst sequence of the SIM card A is received subsequently to finish the communication between the SIM card A and the base station, meanwhile the first burst sequence of the SIM card B is discarded and the second burst sequence of the SIM card B is received in the fourth TDMA frame of the fourth multi-frame. If the conflicts of the SIM card A and the SIM card B are in different logical channels, the CCCH data are received firstly, specifically, if the logical channel of the SIM card A is CCCH and the logical channel of the SIM card B is BCCH, the third burst sequence of the SIM card A is received subsequently, meanwhile the first burst sequence of the SIM card B is discarded and the second burst sequence of the SIM card B is received in the fourth TDMA frame of the fourth multi-frame; if the logical channel of the SIM card A is BCCH and the logical channel of the SIM card B is CCCH, the third burst sequence of the SEM card A is discarded, meanwhile the first burst sequence of the SIM card B is received and processed, and then the second burst sequence of the SIM card B is received in the fourth TDMA frame of the fourth multi-frame.

Figure 8D:
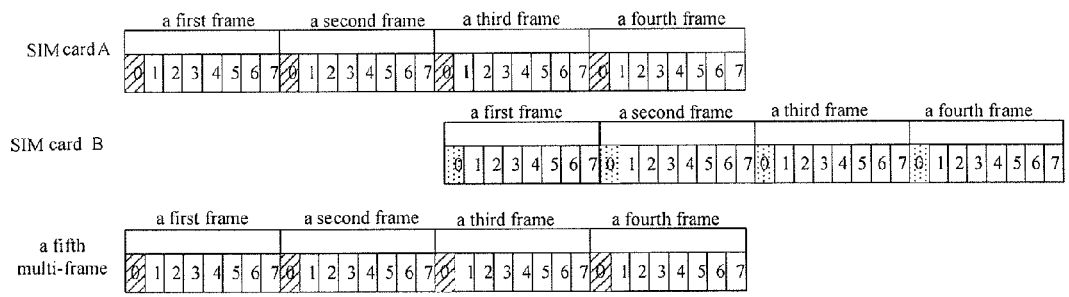

Referring to FIG. 8d, if the SIM card A needs to receive four burst sequences to finish the receiving and processing of the BCCH or CCCH data, the conflicts for receiving the first and second burst sequences of the SIM card B and receiving the third and fourth burst sequences of the SIM card A occurs. In this case, similar to the method shown in FIG. 8c, the CCCH data are received firstly. If the conflicts of the SIM card A and the SIM card B are in the same logical channels, the subsequent burst sequences of the current SIM card is received firstly.

The method of resolving reception conflicts for a multi-card multi-standby mobile terminal of the present invention manages the logical channel conflicts with other SIM cards through using the redundant frames corresponding to the BCCH or CCCH of a SIM card, which resolves the signal conflicts because of the signals from different base stations being not synchronized for a dual-card dual-standby handset and is compatible with the prior art.

Although the present invention has been disclosed as above with reference to preferred embodiments thereof but will not be limited thereto. Those skilled in the art can modify and vary the embodiments without departing from the spirit and scope of the present invention. Accordingly, the scope of the present invention shall be defined in the appended claims.

What is claimed is:

1. A method of resolving reception conflicts for a multi-card multi-standby mobile terminal, wherein the multi-card multi-standby mobile terminal is based on Global System for Mobile communication (GSM) network and in the standby mode, comprising:
   acquiring synchronization result with base stations and judging if there are time slot conflicts between multiple Subscriber Identity Module (SIM) cards of the multi-card multi-standby mobile terminal according to the synchronization result;
   if the conflicts being non-time slot conflicts, receiving and processing data of different SIM cards in different time slots of a Time Division Multiple Address (TDMA)-frame; and
   if the conflicts being time slot conflicts, receiving and processing data of a non-current SIM card in redundant frames of Broadcast Control Channel (BCCH) or Common Control Channel (CCCH) of a current SIM card,
   wherein if the conflicts are between Synchronization Channel (SCH) and BCCH or between SCH and CCCH, and
   if a logical channel of the current SIM card is Synchronization Channel (SCH), receiving and processing data of the SCH of the current SIM card firstly.

2. The method of resolving reception conflicts for a multi-card multi-standby mobile terminal according to claim 1, wherein receiving and processing data of different SIM cards in different time slots of a same TDMA frame comprises:
   receiving and processing the data of the current SIM card in a time slot zero of a TDMA frame of the current SIM card; and
   receiving and processing the data of the non-current SIM card in another time slot of the TDMA frame of the current SIM card.

3. The method of resolving conflicts for a multi-card multi-standby mobile terminal according to claim 1, wherein the multi-card multi-standby mobile terminal is in the standby mode and the CCCH of the multi-card multi-standby mobile terminal is Page Channel (PCH).

4. The method of resolving conflicts for a multi-card multi-standby mobile terminal according to claim 3, wherein when the multi-card multi-standby mobile terminal is in the standby mode and the conflicts are between PCH of the current SIM card and PCH of the non-current SIM card, data of the PCH of the current SIM card are received and processed firstly.

5. The method of resolving conflicts for a multi-card multi-standby mobile terminal according to claim 3, wherein when the multi-card multi-standby mobile terminal is in the standby mode and the conflicts are between PCH of the current SIM card and BCCH of the non-current SIM card, data of the PCH of the current SIM card are received and processed firstly.

6. The method of resolving conflicts for a multi-card multi-standby mobile terminal according to claim 3, wherein when the multi-card multi-standby mobile terminal is in the standby mode and the conflicts are between BCCH of the current SIM card and PCH of the non-current SIM card, data of the PCH of the non-current SIM card are received and processed firstly.

7. The method of resolving conflicts for a multi-card multi-standby mobile terminal according to claim 1, wherein the multi-card multi-standby mobile terminal is a triple-card triple-standby handset.

8. A method of resolving reception conflicts for a multi-card multi-standby mobile terminal, wherein the multi-card multi-standby mobile terminal is based on Global System for Mobile communication (GSM) network and in the standby mode, comprising:
   acquiring synchronization result with base stations and judging if there are time slot conflicts between multiple Subscriber Identity Module (SIM) cards of the multi-card multi-standby mobile terminal according to the synchronization result;
   if the conflicts being non-time slot conflicts, receiving and processing data of different SIM cards in different time slots of a Time Division Multiple Address (TDMA) frame; and
   if the conflicts being time slot conflicts, receiving and processing data of a non-current SIM card in redundant frames of Broadcast Control Channel (BCCH) or Common Control Channel (CCCH) of a current SIM card,
   wherein receiving and processing data of a non-current SIM card in redundant frames of BCCH or CCCH of a current SIM card comprises:
   if the conflicts being between Synchronization Channel (SCH) and BCCH or between SCH and CCCH and the logical channel of the current SIM card having redundant frames, using the redundant frames to receive and process data of SCH of the non-current SIM card;
   if the conflicts being between SCH and BCCH or between SCH and CCCH and the logical channel of the current SIM card having no redundant frames, receiving data of BCCH or CCCH firstly; and
   if the conflicts being between CCCH and BCCH, detecting the logical channels of the current SIM card and the non-current SIM card, wherein if the logical channels of the current SIM card and the non-current SIM card are the same, data received by the current SIM card are received and processed firstly, and if the logical channels of the current SIM card and the non-current SIM card are different, burst sequences of the SIM card whose logical channel is CCCH are received and processed firstly.

9. The method of resolving conflicts for a multi-card multi-standby mobile terminal according to claim 8, wherein when the conflicts are between SCH and BCCH or between SCH and CCCH, whether the logical channel of the current SIM card have redundant frames is determined:
   detecting a signal to noise ratio of the TDMA frame of the current SIM card;
   wherein if the signal to noise ratio is less than 14 dB, the logical channel of the current SIM card has redundant frames; and
   if the signal to noise ratio is bigger than or equal to 14 dB, the logical channel of the current SIM card has no redundant frames.

10. The method of resolving conflicts for a multi-card multi-standby mobile terminal according to claim 8, wherein receiving and processing data of different SIM cards in different time slots of a same TDMA frame comprises:
- receiving and processing the data of the current SIM card in a time slot zero of a TDMA frame of the current SIM card; and
- receiving and processing the data of the non-current SIM card in another time slot of the TDMA frame of the current SIM card.

11. The method of resolving conflicts for a multi-card multi-standby mobile terminal according to claim 8, wherein the multi-card multi-standby mobile terminal is in the standby mode and the CCCH of the multi-card multi-standby mobile terminal is Pane Channel (PCH).

12. The method of resolving conflicts for a multi-card multi-standby mobile terminal according to claim 8, wherein the multi-card multi-standby mobile terminal is a triple-card triple-standby handset.

* * * * *